Figure 1:
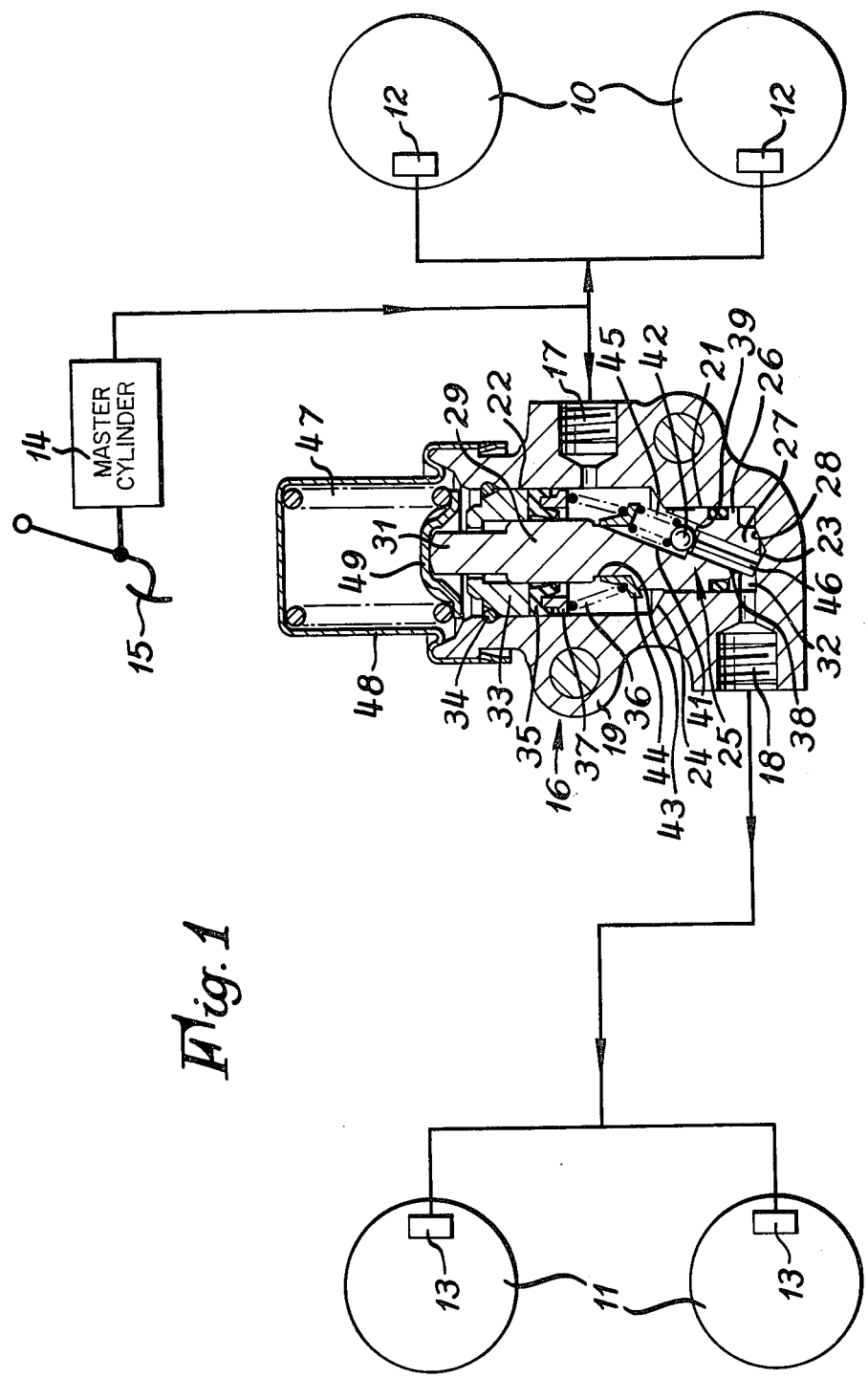

United States Patent [19]

Young

[11] 4,008,925
[45] Feb. 22, 1977

[54] VALVE DEVICES FOR USE IN LIQUID PRESSURE BRAKING SYSTEMS OF VEHICLES

[75] Inventor: Alastair John Young, Leamington Spa, England

[73] Assignee: Automotive Products Company Limited, Leamington Spa, England

[22] Filed: Nov. 26, 1975

[21] Appl. No.: 635,627

[30] Foreign Application Priority Data

Jan. 31, 1975  United Kingdom ............... 4371/75

[52] U.S. Cl. .............................. 303/6 C; 188/349; 303/22 R
[51] Int. Cl.² ........................ B60T 8/22; B60T 8/26
[58] Field of Search ............... 303/6 C, 6 R, 84, 22; 188/195, 349

[56] References Cited
UNITED STATES PATENTS

| | | | |
|---|---|---|---|
| 3,149,886 | 9/1964 | Dorner | 303/6 C X |
| 3,467,440 | 9/1969 | Strien | 303/6 C |
| 3,545,814 | 12/1970 | Margetts | 303/6 C |
| 3,736,031 | 5/1973 | Yabuta et al. | 303/6 C |
| 3,804,468 | 4/1974 | Ishikawa et al. | 303/6 C |
| 3,848,932 | 11/1974 | Lewis | 303/84 A X |

*Primary Examiner*—Trygve M. Blix
*Assistant Examiner*—Douglas C. Butler
*Attorney, Agent, or Firm*—Kemon, Palmer & Estabrook

[57] ABSTRACT

A valve device for use in liquid pressure vehicle braking systems to control rear brake pressure comprises a plunger in a cavity in a housing, the cavity being closed at one end. The plunger has a land which slides within a portion of the cavity. The area of the plunger that is exposed to liquid pressure at the closed end of the cavity is greater than the area of the plunger that is exposed to liquid pressure on the other side of the land. A passage through the land is inclined to the axis of the plunger. A valve unseating pin in the inclined passage co-operates with a frusto-conical surface of the cavity to unseat a ball in the inclined passage. A biasing spring surges the plunger towards the closed end of the cavity against the action upon the plunger of rear brake pressure which acts upon the larger presented area portion of the plunger. Liquid pressure is transmitted from the master cylinder to the rear brake operating motor cylinders when the ball is unseated and not when the ball is seated. The valve functions so that rear brake pressure increases at the same rate as does master cylinder pressure from the commencement of braking until a predetermined liquid pressure has been built up whereafter it is reduced in relation to master cylinder pressure. The valve may be arranged so that the pressure that must be built up before there is any reduction in the rear brake pressure compared with master cylinder pressure is higher in the event of failure of the front brake operating sub-system than it is when both the front brake and rear brake operating sub-systems are operating normally.

10 Claims, 4 Drawing Figures

VALVE DEVICES FOR USE IN LIQUID PRESSURE BRAKING SYSTEMS OF VEHICLES

This invention relates to valve devices for use in liquid pressure braking systems of vehicles to so control the pressure exerted to apply brakes on a group of wheels of the vehicles, usually the rear wheels, that that pressure, under a predetermined condition, is reduced in relation to the pressure at the source from which that pressure is derived, the predetermined condition being the pressure in the braking system at which the valve device becomes operative.

Valve devices for this purpose have been proposed previously and have consisted of a plunger which is slidable in a cavity in a valve body and which has a land which makes a fluid-tight sliding joint with the wall of the cavity, the cavity being adapted to be connected, by a first port on one side of the plunger land, to a source of liquid pressure for applying the brakes of a vehicle and by a second port on the other side of the plunger land to motor cylinders for operating the rear brakes of the vehicle and the plunger being so arranged that the area thereof exposed to liquid pressure at the first port is less than that exposed to liquid pressure at the second port. Biassing means are provided, at least when the valve device is installed on a vehicle for use, the biassing means being operable to urge the plunger in the same direction as does liquid pressure at said first port, stop means being provided to limit movement of the plunger in that direction and and there being a passage which by-passes the plunger and which is controlled by a one-way valve which, when closed, allows flow of liquid only from the second port to the first port, the one-way valve being held open mechanically when the plunger is in its position that is determined by the limiting action of the stop means and being allowed to close when the plunger moves away from the stop means. It will be apparent that, due to the action of liquid pressure that acts in such a valve device when that valve device is in use, there will be a resultant thrust on the plunger which tends to move it, against the action of the biassing means, away from the stop means and that, when the source pressure rises to a value at which such thrust is sufficient to overcome the biassing means, the plunger will be so moved, allowing the one-way valve to close, and, with further rise in the source pressure, the pressure in the rear brake motor cylinders will rise at a lower rate than said source pressure.

It is the object of the present invention to provide an improved valve device as set out in the last preceding paragraph.

According to the present invention there is provided a valve device for use in a liquid pressure braking system of a vehicle to so control the pressure that is exerted to apply brakes on a group of wheels of the vehicle that that pressure, under a predetermined condition, is reduced in relation to the pressure at the source from which that pressure is derived, the predetermined condition being the pressure of the braking system at which the valve device becomes operative, including a plunger which is slidable in a cavity in a valve body and which has a land which makes a fluid-tight sliding joint with the wall of the cavity, the cavity being adapted to be connected, by a first port on one side of the plunger land, to a source of liquid pressure and by a second port on the other side of the plunger land to motor cylinders for operating brakes on said group of wheels, the plunger being so arranged that the area thereof exposed to liquid pressure at the first port is less than that exposed to liquid pressure at the second port, stop means which limit movement of the plunger in the direction in which it is urged by the action of liquid pressure at said first port and in which it is arranged to be biassed at least during operation of the liquid pressure braking system, and a passage in the plunger which by-passes the plunger and which is controlled by a one-way valve which, when seated, allows flow of liquid only from the second port to the first port, the one-way valve being held unseated mechanically when the plunger is in its position that is determined by the limiting action of the stop means and being allowed to seat when the plunger moves away from the stop means, the arrangement being such that, due to the action of the liquid pressure that acts in the valve device when that valve device is in use, there is a resultant thrust on the plunger which tends to move it away from the stop means against the action of the biassing means that exerts the biassing force that urges it in the same direction as does liquid pressure at said first port, and that, when the source pressure rises to a value at which such thrust is sufficient to overcome the action of the biassing means, the plunger is so moved, allowing the one-way valve to close, and, with further rise in the source pressure, pressure in the motor cylinders that operate the brakes of said group of wheels rises at a lower rate than said source pressure, wherein that part of the by-pass passage in the plunger which extends from the seat for the one-way valve closure member towards said other side of the plunger land is inclined to the axis of the plunger, there being a valve unseating pin within said by-pass passage part which co-operates with a stop surface in the cavity to unseat the one-way valve closure member when the plunger engages the stop means, and resilient means which act to seat the closure member, the resilient means acting against abutment means carried by the plunger.

Preferably the remainder of the by-pass passage in the plunger is coaxial with said by-pass passage part.

The by-pass passage may be stepped to provide a shoulder at the junction of said by-pass passage part and the remainder of the by-pass passage, the shoulder serving as the seat for the one-way valve closure member. The by-pass passage may comprise a bore which extends through the plunger and which is stepped intermediate its ends to form the shoulder that serves as the seat for the one-way valve closure member.

Conveniently the cavity is at least part of a bore in the valve body.

The valve unseating pin may be engaged slidably within said by-pass passage part. Alternatively the valve unseating pin is carried by the closure member. The stop surface may be a surface of said stop means which may comprise a closed end of the cavity, the stop surface being part of the surface of a conical recess within the surface of that closed end of the cavity. Alternatively the stop surface may be a shoulder in the surface of the cavity. The shoulder may be frusto-conical. The axis of said by-pass passage part may be substantially normal to the stop surface. Conveniently the end of the cavity at the side of the plunger land on which the first port is located is closed by a bush which surrounds the plunger and provides support for a packing ring which engages both the wall of the cavity and the plunger.

The abutment means may comprise a ring which is carried by the plunger and which surrounds part of the plunger when the remainder of the by-pass passage in the plunger is coaxial with said by-pass passage part. The axis of said by-pass passage may be normal to a frusto-conical surface which is the surface of the ring against which the resilient means react. The ring may be a resilient split ring which is engaged in a shoulder on the plunger. A conical coil spring may be included between the packing ring and the resilient split ring, the conical coil spring holding the packing ring against the bush and acting on a surface of the split ring in such a way that it provides a radially inwardly directed force on said split ring. The smaller diameter end turn of the conical coil spring may be seated in an annular shoulder that is formed between two juxtaposed frusto-conical surface portions of the split ring which taper in the same direction and have different cone angles. The radially outer one of two juxtaposed frusto-conical surface portions of the resilient split ring may be substantially parallel to the frusto-conical surface portion of the ring against which the resilient means react. Conveniently the valve body carries a spring retainer and a coil spring which reacts against the spring retainer and acts directly upon the plunger to urge the plunger towards said stop means, the coil spring thereby serving as said biassing means.

Figure 2:
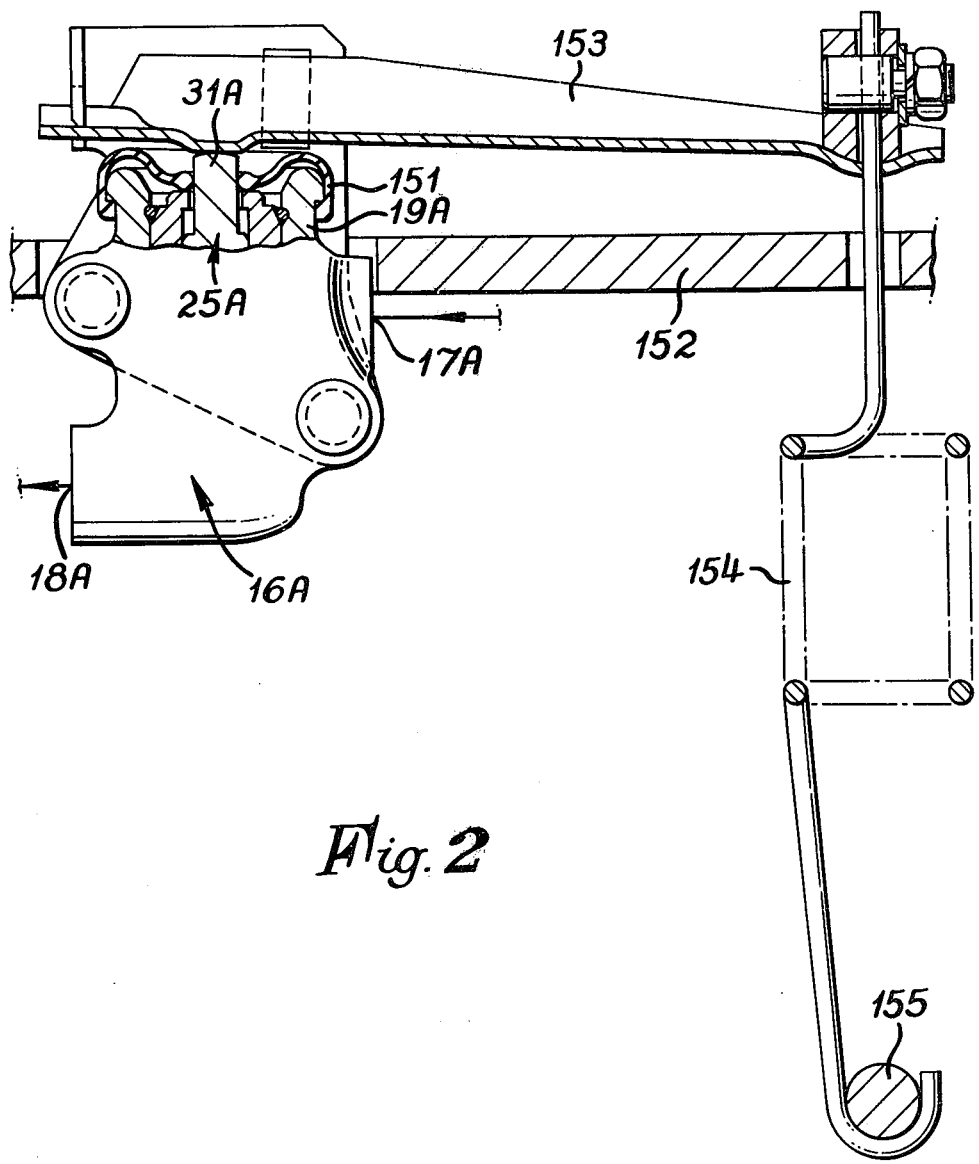
Figure 3:
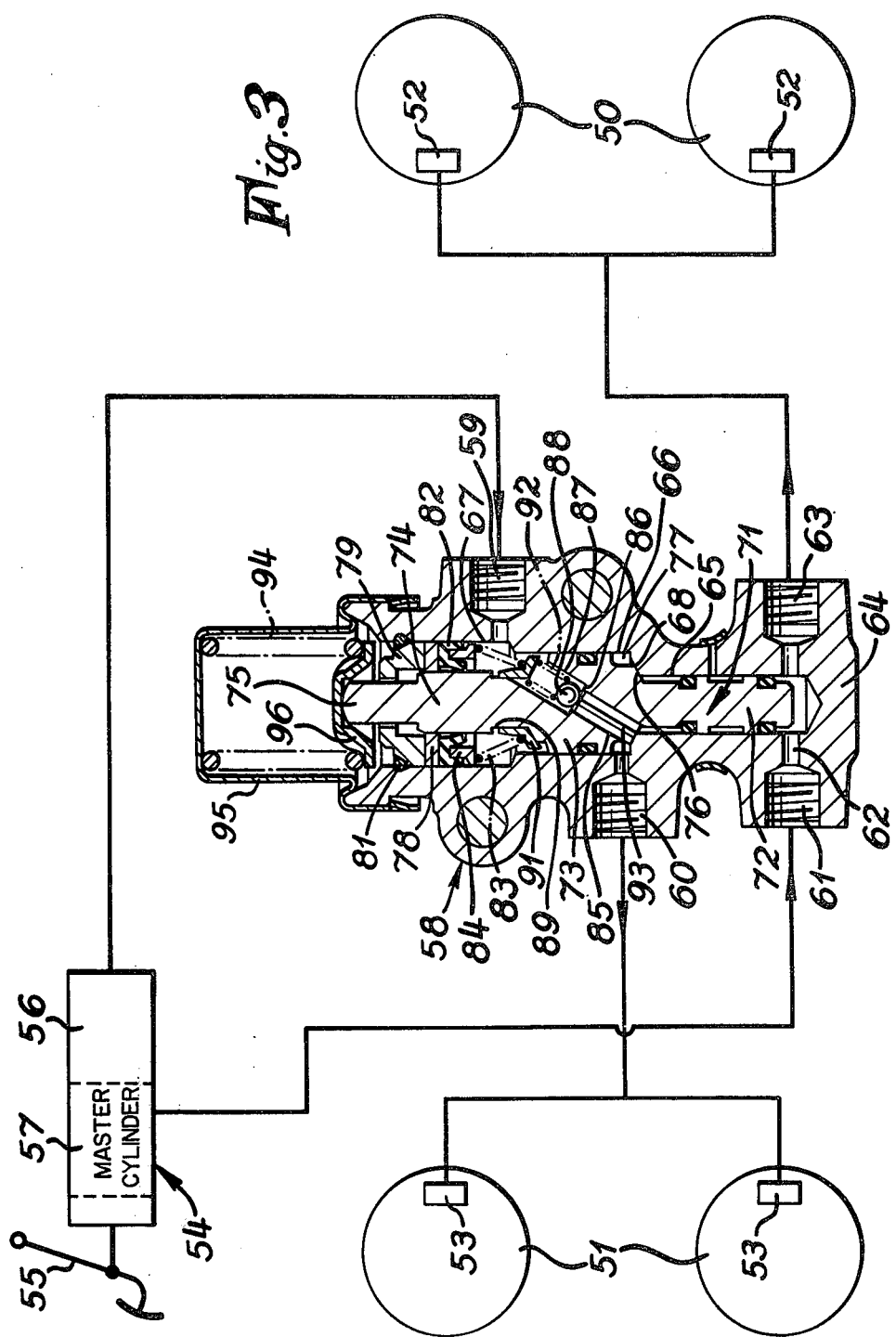
Figure 4:
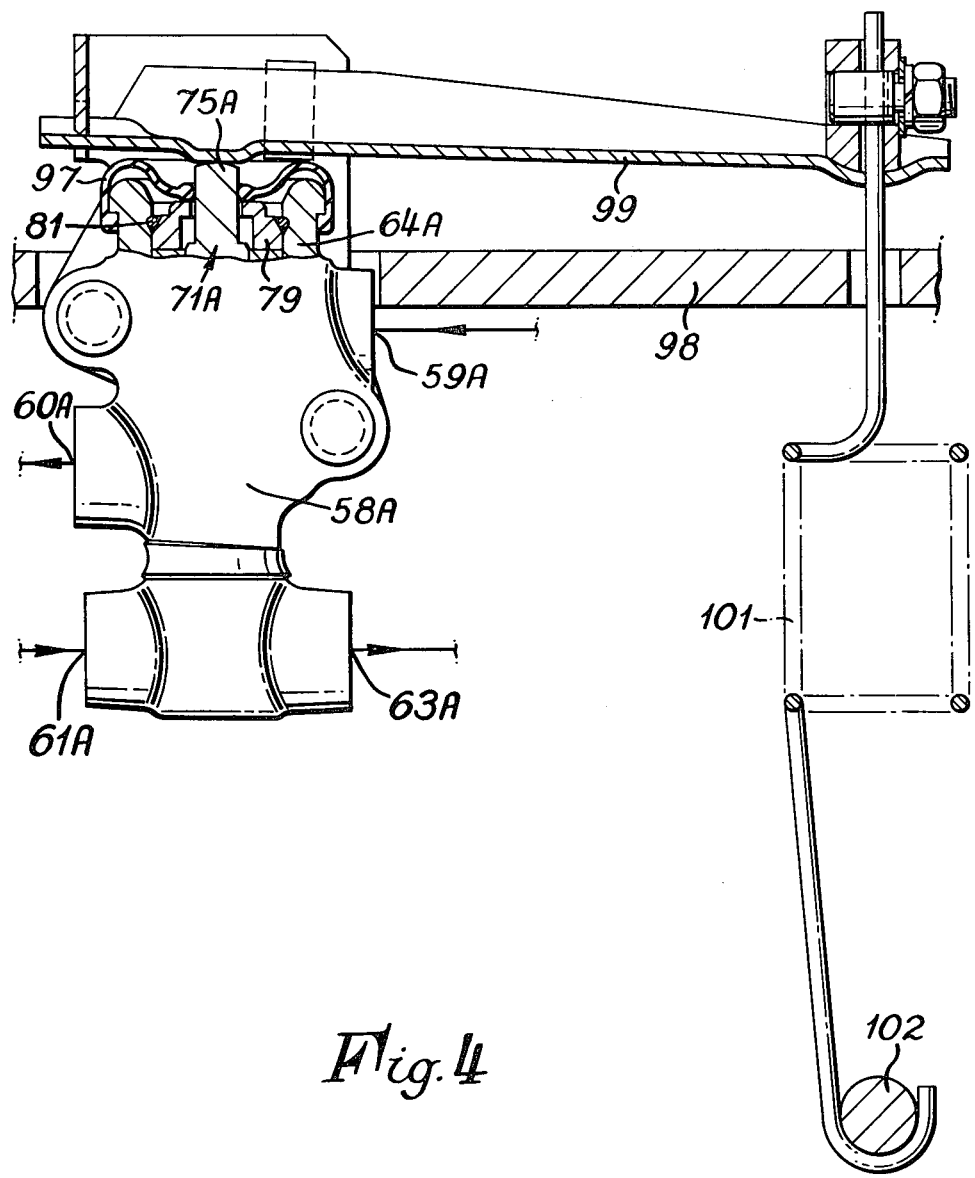

Several embodiments of this invention will be described now by way of example with reference to the accompanying drawings of which:

FIG. 1 is a diagrammatic illustration of a liquid pressure braking system for a vehicle, the braking system including a valve device for controlling liquid pressure which acts to apply brakes to the rear wheels of the vehicle, the valve device being shown sectioned in a transverse plane which includes its longitudinal axis;

FIG. 2 illustrates an assembly of a modified form of the valve device shown in FIG. 1 with a spring system which is arranged to exert a biassing load upon the plunger assembly of the valve device which varies with loading of the vehicle, the major part of the valve device being shown in elevation and only that part of the valve device that differs from the valve device shown in FIG. 1 being shown in section;

FIG. 3 is a diagram similar to FIG. 1 of a liquid pressure braking system of the split type for a vehicle; and FIG. 4 is an illustration, similar to FIG. 2, of an assembly of a modified form of the valve device shown in FIG. 3 with the spring system which is arranged to exert a biassing load upon the plunger assembly of the valve device which varies with the loading of the vehicle.

Referring to FIG. 1 of the drawings, the front and rear wheels of a vehicle are represented by circles 10 and 11 respectively, liquid pressure motor cylinders which operate brakes on the front wheels being shown at 12 and corresponding motor cylinders which operate brakes on the rear wheels being shown at 13. A master cylinder 14 is operated by a pedal 15. The chamber of the master cylinder 14 has a liquid pressure outlet which is in direct conduit communication with the motor cylinders 12 that operate the brakes on the front wheels 10 and communicate with the motor cylinders 13 that operate brakes on the rear wheels 11 through a valve device 16 which embodies this invention.

The valve device 16 has an inlet 17 which is in conduit communication with the liquid pressure outlet of the master cylinder 14, an outlet 18 which is in conduit communication with the motor cylinders 13 that operate brakes on the rear wheels 11 and operates to control the communication between the inlet 17 and the outlet 18.

The valve device 16 comprises a main valve body 19 in which a stepped bore is formed, the stepped bore being closed at one end and open at the other so that it forms a cavity. The stepped bore has one portion 21 at its closed end and a second portion 22 which has a diameter which is larger than the diameter of the bore portion 21 and which extends to the open end of the stepped bore. A conical recess 23 is formed at the centre of the closed end surface of the stepped bore and a frusto-conical shoulder 24 is provided between the two bore portions 21 and 22 of the stepped bore which is flared outwardly at its outer end.

A plunger 25, which is mounted slidably within the stepped bore, comprises a land 26 which carries a packing ring which is a fluid-tight sliding fit within the cylindrical wall of the smaller diameter bore portion 21, a reduced diameter portion 27 which projects coaxially from the land 26 towards the closed end of the stepped bore and a stem which extends from the land 25 through the open end of the stepped bore. The end face of the reduced diameter portion 27 of the plunger 25 that faces the surface of the closed end wall of the stepped bore is shaped to form a frusto-conical surface portion 28 which conforms with the angle of the conical recess 23 and which is adapted to seat within the conical recess 23. Hence the frusto-conical surface portion 28 serves as stop means which limit movement of the plunger 25 towards the closed end of the stepped bore. The stem has a main portion 29 which has a diameter which is smaller than the diameter of the land 26 and which is greater than the diameter of the reduced diameter portion 27, and an outer portion 31 which has a diameter which is smaller than the diameter of the main stem portion 29. The annular shoulder that is formed by the land 26 and by the reduced diameter end portion 27 of the plunger 25 co-operates with the closed end of the smaller diameter bore portion 21 to bound an annular recess 32 when the frusto-conical surface portion 28 of the plunger 25 is seated within the conical recess 23.

A bush 33 surrounds the outer part of the main stem portion 29 and is held within the stepped bore by a wire retainer loop 34 which is engaged within an annular recess in the cylindrical surface of the larger diameter bore portion 22 and which is positioned between the bush 33 and the outer end of the stepped bore. A packing ring 35, which engages both the cylindrical wall of the larger diameter bore portion 22 and the peripheral surface of the main stem portion 29 is urged against the surface of the bush 33 that is nearer the closed end of the stepped bore by the action of a conical coil spring 36 which acts upon it through a reaction ring 37.

A through bore is formed in the plunger 25 and is inclined to the axis of the plunger 25. One end of the through bore is formed in those parts of the surface of the reduced diameter plunger portion 27 that form the frusto-conical surface portion 28 and communicate with the annular recess 32. The other end of the through bore is formed on the other side of the land 26. The through bore is stepped, its smaller diameter portion 38 being the part of the bore that opens into the frusto-conical surface portion 28 and communicates with the annular recess 32. The step 39 between the smaller diameter bore portion 38 and a larger diameter bore portion 41 is a valve seat for a ball 42 which is the closure member of a one-way valve which controls flow through the stepped through bore.

A circumferential groove 43 is formed in the main stem portion 29 of the plunger 25. A split ring 44 of stiff resilient plastics material is mounted within the groove 43 and is formed initially so as to tend to contract into the groove 43. The split ring 44 is fitted in position within the groove 43 firstly by expanding it sufficiently for it to be passed over the main stem portion 29 of the plunger 25 so that it can be slid along that main stem portion 29 from the reduced diameter stem portion 31 towards the land 26. The groove 43 is so positioned that the split ring 44 extends across the open end of the larger diameter bore portion 41 of the stepped through bore when that split ring 44 is fitted in position within the groove 43. The surface of the split ring 44 that faces the stepped through bore is frusto-conical and has a cone angle such that it is substantially perpendicular to the axis of the stepped through bore. The opposite surface of the split ring 44 forms two juxtaposed frusto-conical portions which taper in the same direction and which have different cone angles. The radially outer one of the two juxtaposed frusto-conical portions, which is the one nearer the land 26 and which has the larger cone angle, is substantially parallel to the frusto-conical surface of the ring 44 that faces the open end of the stepped through bore. The smaller diameter end turn of the conical coil spring 36 is seated within the shoulder that is formed between the two juxtaposed frusto-conical portions of the split ring 44. The conical coil spring 36 thus exerts a force upon the split ring 44 that tends to contract the split ring 44 into the circumferential groove 43, in addition to urging the packing ring 35 into contact with the bush 33.

The split ring 44 provides an abutment for resilient means which comprise a coiled compression spring 45 which act to urge the ball 42 towards its seat 39. A pin 46 of non-circular cross-section is slidable in the smaller diameter bore portion 38 of the stepped through bore and is of such a length that, when the frusto-conical surface portion 28 of the reduced diameter plunger portion 27 is seated within the conical recess 23, the pin 46, which also contacts the surface of the conical recess 23, holds the ball 42 unseated against the action of the coil spring 45.

The biassing load that urges the plunger 25 towards the closed end of the stepped bore, and thus tends to seat the frusto-conical surface portion 28 of the plunger 25 in the conical recess 23, is provided by a coiled compression spring 47 which reacts against a cup-shaped pressed metal can spring retainer 48 which is mounted on the valve body 19 around the open end of the stepped bore. The compression spring 47 acts on an annular disc 49 which is fitted over the outer end of the reduced diameter end portion 31 of the plunger stem.

The inlet 17 of the valve device 16 comprises a first port which communicates with the larger diameter bore portion 22 of the stepped bore in the valve body 19 between the packing ring 35 and the frusto-conical shoulder 24. The outlet 18 comprises a second port which communicates with the annular recess 32 when the frusto-conical surface 28 of the plunger 25 is seated within the conical recess 23. The dimensions of the reduced diameter plunger portion 27 and main stem portion 29 are such that the area of the plunger 25 that is exposed to fluid pressure at the first port 17 is less than the area of the plunger 25 that is exposed to the second port 18.

When the liquid in the system in not pressurized so that the brakes on all four wheels 10 and 11 of the vehicle are released, the plunger 25 is held by the biassing spring 47 in the position in which its frusto-conical surface portion 28 is in contact with the surface of the conical recess 23 that is formed in the closed end of the stepped bore in the valve body 19 and the valve closure ball 42 in the stepped through bore in the plunger 25 is held off its seat 39 by the pin 46. When the liquid pressure master cylinder 14 is operated and liquid pressure is built up in the braking system to apply brakes to all four wheels 10 and 11 of the vehicle, in addition to being transmitted directly to the brake operating motor cylinders 12 in which that liquid pressure acts to apply brakes to the front wheels 10 of the vehicle, the liquid pressure that is generated in the chamber of the master cylinder 14 is transmitted directly to the brake operating motor cylinders 13 in which that liquid pressure acts to apply brakes to the rear wheels 11 of the vehicle. The liquid pressure is transmitted from the chamber of the master cylinder 14 into the valve device 16 through the inlet port 17, past the single land 26 of the plunger 25 by the by-pass passage which comprises the stepped through bore that is formed in the plunger 25, and to the outlet port 18 that is in communication with the motor cylinders 13 via the annular recess 32 that is in communication with the downstream end of the smaller diameter portion 38 of the stepped through bore in the plunger 25. The liquid pressure that acts in the motor cylinders 13 to apply brakes to the rear wheels 11 of the vehicle acts within the annular recess 32 and upon the single land 26 of the plunger 25 in opposition to the action exerted on the plunger 25 by the biassing coil spring.

When the liquid pressure that is transmitted from the chamber of the master cylinder 14 through the valve device 16 to the brake operating motor cylinders 13 that operate to apply brakes to the rear wheels 11 builds up to a predetermined value, the loading on the plunger 25 due to liquid pressure that acts in the annular recess 32 exceeds the load that is applied to the plunger 25 in the opposite direction due to the action of the liquid pressure that is generated in the chamber of the master cylinder 14 within that part of the larger diameter stepped bore 22 that is formed within the valve body 19 between the packing ring 35 and the single land 26 of the plunger 25, and by the biassing coil spring 47. Hence the plunger 25 is moved away from the closed end of the stepped bore that is formed in the valve body 19, the frusto-conical surface portion 28 of the plunger 25 and the valve unseating pin 46 being moved away from the surface of the co-operating conical recess 23. Thus the ball 42 is seated upon the annular valve seat 39 by the action of the coil spring 45 so that the one-way valve functions to permit liquid pressure transfer through the passage through the plunger 25 that is provided by the stepped through bore in the plunger 25, only in the direction from the second port 18 towards the first port 17. With further increase in the pressure that is generated in the chamber of the master cylinder 14, the pressure that acts in the motor cylinders 13 to apply brakes to the rear wheels 11 of the vehicle increases at a lesser rate than the rate of increase in the chamber of the master cylinder 14, due to the well-known combined action of the plunger 25 and the one-way ball valve 42.

The biassing means that act on the value plunger assembly of a valve device in which the present invention is embodied may be provided by a spring which exerts a load upon the plunger assembly which varies with the loading of the vehicle, or by the pressure in a pneumatic or hydro-pneumatic suspension system.

FIG. 2 shows a valve device 16A which is a modified form of the valve device 16. The following description of the valve device 16A will be limited to those features of the valve 16A that differ from the corresponding features of the valve device 16. Features of the valve device 16A that are similar to corresponding features of the valve device 16 and which are referred to in the following description of the valve device 16A will be identified by the references by which the corresponding parts of the valve device 16 are identified above and to which the suffix "A" is added. The valve 16A differs from the valve device 16 in that the coil spring 47 and the spring retainer can 48 are omitted, the reduced diameter outer stem portion 31A of the valve device 16A extending through the central aperture of an annular boot 151 of flexible material. The valve body 19A of the valve device 16A is mounted on the body 152 of the vehicle so that the reduced diameter outer stem portion 31A of the plunger 25A projects towards a lever 153 which is mounted pivotally upon the valve body 19A. A coil spring 154 has one end coupled with a component 155 of the vehicle suspension system which moves with up and down movement of the rear wheels 11 of the vehicle relative to the vehicle body 152 and the other end coupled to an end portion of the lever 153 which is spaced from the lever fulcrum.

The valve device 16A has an inlet 17A and an outlet 18A which are similar to those of the valve device 16 and by which it is connected in a similar manner into a liquid pressure braking system which is similar to that which has been described above with reference to FIG. 1. The plunger assembly 25A of the valve device 16A is urged toward the lever 153 by the differential liquid pressure loading that acts upon it when the master cylinder 14 is operated to apply the brakes, so that the reduced diameter outer stem portion 31A of the plunger 25A abuts a point on the lever 153 which is spaced from the point on that lever 153 to which the coil spring 154 is coupled. Hence the coil spring 154 acts through the lever 153 to exert a biassing load upon the plunger 25A which varies with the loading of the vehichle and which acts to oppose the differential liquid pressure loading upon the plunger 25A.

Referring now to FIG. 3 of the drawings, the front wheels and rear wheels of a vehicle are represented by the circles 50 and 51 respectively, liquid pressure motor cylinders which operate brakes on the front wheels 50 being shown at 52 and corresponding motor cylinders which operate brakes on the rear wheels 51 being shown at 53. A tandem master cylinder 54 is operated by a pedal 55 and includes chambers 56 and 57 in which pressure is generated. The chamber 56 and 57 are connected respectively to the motor cylinders 53 and 52 and, being isolated from one another, comprise separate sources of liquid pressure. The master cylinder chamber 56 and motor cylinders 53 thus constitute a rear brake operating sub-system of the liquid pressure braking system, whilst the master cylinder chamber 57 and motor cylinders 52 constitute a front brake operating subsystem of the liquid pressure braking system.

A valve device 58, which embodies this invention, is incorporated in the rear brake operating sub-system. A conduit leads from the chamber 56 of the master cylinder 54 to an inlet 59 of the valve device 58 and the valve device 58 controls communication between the inlet 59 and an outlet 60 from which a conduit leads to the rear brake motor cylinders 53. The front brake operating sub-system includes a conduit which leads from the other chamber 57 of the master cylinder 54 to a second inlet 61 of the valve device 58. A constantly open passage 62 in the valve device 58 places the second inlet 61 in communication with a second outlet 63 which is connected to the front brake motor cylinders 62.

The valve device 58 comprises a main valve body 64 in which a stepped bore is formed, the stepped bore being closed at one end and open at the other. The stepped bore has a first portion 65 at its closed end, a second intermediate portion 66 which has a diameter which is larger than the diameter of the first bore portion 65, and a third portion 67 which extends from the intermediate bore portion 66 to the open end of the stepped bore, the diameter of the third bore portion 67 being greater than the diameter of the intermediate bore portion 66. A frusto-conical shoulder 68 is provided between the first and second bore portions 65 and 66. The outer end of the third bore portion 67 is flared.

A plunger 71, which is mounted slidably within the stepped bore, comprises one portion 72, which is slidable in the smallest diameter bore portion 65 and which includes two axially spaced lands, each land carrying a packing ring which engages the cylindrical wall of that bore portion 65, a larger diameter portion 73 which has a single land which carries a single packing ring which engages the cylindrical wall of the intermediate diameter bore portion 66, and a stem which extends from the larger diameter plunger portion 73 through the open end of the stepped bore. The stem has a main portion 74 which has a diameter which is smaller than the diameter of the larger diameter plunger portion 73 and an outer end portion 75 which has a diameter which is smaller than the diameter of the main stem portion 74. The junction between the inner end plunger portion 72 and the larger diameter plunger portion 73 is shaped to form a frusto-conical chamfered portion 76 which conforms with the angle of the frusto-conical shoulder 68 in the stepped bore and which is adapted to seat upon that frusto-conical shoulder 68, and an annular shoulder which co-operates with the wall of the stepped bore to bound an annular recess 77 which is formed at the end of the intermediate bore portion 66 that is nearer the closed end of the stepped bore when the frusto-conical chamfered surface portion 76 of the plunger is seated upon the frusto-conical shoulder 68 of the stepped bore.

A bush 78 surrounds the main stem portion 74 of the plunger 71 and abuts an annular insert 79 which is positioned between it and the outer end of the stepped bore. The insert 79 is held within the stepped bore by a wire retainer loop 81 which is engaged within an annular recess in the cylindrical surface of the largest diameter bore portion 67 and which is positioned between the insert 79 and the outer end of the stepped bore. A packing ring 82, which engages both the cylindrical wall of the largest diameter bore portion 67 of the stepped bore and the peripheral surface of the main stem portion 74 of the plunger 71 is urged against the surface of the bush 78 that is remote from the insert 79 by the action of a conical coil spring 83 which acts upon it through a reaction ring 84.

A through bore is formed in the plunger 71 and is inclined to the axis of the plunger 71. One end of the through bore is formed in the frusto-conical chamfered surface portion 76 of the plunger 71 and the other end is formed on the other side of the single land that is formed by the larger diameter plunger portion 73. The through bore is stepped, its smaller diameter portion 85 being the portion that opens into the frusto-conical chamfered surface portion 76 of the plunger 71. The step 86 between the smaller diameter bore portion 85 and a larger diameter bore portion 87 is a seat for a ball 88 which is the closure member of a one-way valve which controls flow through the stepped through bore.

A circumferential groove 89 is formed in the main stem portion 74 of the plunger 71. A split ring 91 of stiff, resilient plastics material is mounted within the groove 89 and is formed initially so as to tend to contract into the groove 89. The split ring 91 is fitted in position within the groove 89 firstly by expanding it sufficiently for it to be passed over the main stem portion 74 of the plunger 71 so that it can be slid along that main stem portion 74 from the reduced diameter stem portion 75 towards the larger diameter plunger portion 73. The groove 89 is so positioned that the split ring 91 extends across the open end of the larger diameter bore portion 87 of the stepped through bore when that split ring is fitted in position within the groove 89. The surface of the split ring 91 that faces the stepped through bore is frusto-conical and has a cone angle such that it is substantially perpendicular to the axis of the stepped through bore. The opposite surface of the split ring 91 forms two juxtaposed frusto-conical portions which taper in the same direction and which different cone angles. The radially outer one of the two juxtaposed frusto-conical portions, which is the one nearer the larger diameter plunger portion 73 and which has the larger cone angle, is substantially parallel to the frusto-conical surface of the ring 91 that faces the open end of the stepped through bore. The smaller diameter end turn of the conical coil spring 83 is seated within the shoulder that is formed between the two juxtaposed frusto-conical portions of the split ring 91. The conical coil spring 83 thus exerts a force upon the split ring 91 that tends to contract the split ring 91 into the circumferential groove 89, in addition to urging the packing ring 82 into contact with the bush 78.

The split ring 91 provides an abutment for a coiled compression spring 92 which urges the ball 88 towards its seat 86. A pin 93 of non-circular cross-section is slidable in the smaller diameter bore portion 85 of the stepped-through bore and is of such a length that, when the frusto-conical chamfered surface 76 of the plunger 71 is seated upon the co-operating frusto-conical shoulder 68 of the stepped bore in the valve body 64, the pin 93, which also contacts the frusto-conical shoulder 68, holds the ball 88 displaced from its seat 86 against the action of the coil spring 92.

The biassing load that urges the plunger 71 towards the closed end of the stepped bore, and thus tends to seat the frusto-conical chamfered surface 76 upon the co-operating frusto-conical shoulder 68, is provided by a coiled compression spring 94 which reacts against a cup-shaped pressed metal can spring retainer 95 which is mounted on the valve body 64 around the open end of the stepped bore. The compression spring 94 acts on an annular disc 96 which is fitted over the outer end of the reduced diameter end portion 75 of the plunger stem.

The larger diameter plunger 73 of the plunger 71 is slidable within the central one, 66, of three bores and is the central one of three portions of that plunger 71, the other two plunger portions comprising the inner plunger portion 72 that is slidable within the closed end bore portion 65 and the main stem portion 74 that is slidable within the bore of the bush 78.

The inlet 59 of the valve device 58 comprises a port which communicates with the largest diameter bore portion 67 of the stepped bore in the valve body 64 between the packing ring 82 and the shoulder between that bore portion 67 and the intermediate bore portion 66. The outlet 60 comprises a port which communicates with the annular recess 77 that is formed on the opposite side of the single land that is formed by the larger diameter plunger portion 73. The axial length of the inner smaller diameter plunger portion 72 is less than the axial length of the closed end bore portion 65 so that there is a space between the inner end of the plunger 71 and the closed end of the stepped bore in the valve body 64 when the chamfered frusto-conical surface portion 76 of the plunger 71 is seated upon the co-operating frusto-conical shoulder 68 of the stepped bore. That space at the inner end of the stepped bore forms part of the constantly-open passage 62 that connects the inlet 61 to the outlet 63.

When the liquid in both sub-systems of the liquid pressure braking system is not pressurised so that the brakes on all four wheels 50 and 51 of the vehicle are released, the plunger 71 is held by the biassing spring 94 in the position in which its frusto-conical chamfered surface portion 76 is in contact with the frusto-conical shoulder 68 in the stepped bore that is formed in the valve body 64 and the valve closure ball 88 in the stepped through bore in the plunger 71 is held off its seat 86 by the pin 93. When the tandem master cylinder 54 is operated and liquid pressure is built up in both sub-systems of the liquid pressure braking system to apply brakes to all four wheels 50 and 51 of the vehicle, the liquid pressure that is generated initially in the master cylinder chamber 56 is transmitted directly to the brake operating motor cylinders 53 in which that liquid pressure acts to apply brakes to the rear wheels 51 of the vehicle. The liquid pressure is transmitted from the master cylinder chamber 56 into the valve device 58 through the inlet port 59, past the single land of the larger diameter plunger portion 73, through the stepped through bore that is formed in the plunger 71, and to the outlet port 60 that is in communication with the motor cylinders 53 via the annual recess 77 that is in communication with the downstream end of the smaller diameter bore portion 85 of the stepped through bore in the plunger 71. The liquid pressure that acts in the motor cylinders 53 to apply brakes to the rear wheels 51 of the vehicle acts within the annular recess 77 and upon the single land of the larger diameter plunger portion 73 in opposition to the action exerted on the plunger 71 by the biassing coil spring 94. The liquid pressure that acts in the motor cylinders 52 to apply brakes to the front wheels 50 of the vehicle acts within the space between the closed end wall of the stepped bore that is formed in the valve body 64 and the end face of the inner smaller diameter plunger portion 72 and hence acts upon the smaller diameter plunger portion 72 to oppose the load exerted upon the plunger 71 by the biasing coil spring 94.

When the liquid pressure, that is transmitted from the chambers 56 and 57 of the tandem master cylinder 54 through the valve device 58 to the respective motor cylinders 52 and 53 in which it acts to apply brakes to the wheels 50 and 51 of the vehicle, builds up to a predetermined value, the loading on the plunger 71 due to liquid presure that acts in the annular recess 77 and the liquid pressure that acts within the space that is formed between the closed inner end wall of the stepped bore and the end face of the smallest diameter plunger portion 72 exceeds the load that is applied to the plunger 71 in the opposite direction due to the action of the liquid pressure that is generated in the master cylinder chamber 56 within that part of the stepped bore that is formed within the valve body 64 between the single land of the larger diameter plunger portion 73 and the packing ring 82 and by the biassing coil spring 94. Hence the plunger 71 is moved away from the closed end of the stepped bore that is formed in the valve body 64, the frusto-conical chamfered surface portion 76 being moved away from the co-operating frusto-conical shoulder 68 so that the ball 88 is seated upon the annular valve seat 86 to close the passage through the piston 71 that is provided by the stepped through bore in the plunger 71. With further increase in the pressure that is generated within the master cylinder chamber 56, the pressure that acts in the motor cylinders 53 to apply brakes to the rear wheels of the vehicle increases at a lesser rate than the rate of increase of the liquid pressure in the tandem master cylinder chamber 56, due to the well-known combined action of the plunger 71 and the one-way ball valve 88.

Since liquid presure in the front brake operating sub-system acts on the end face of the smaller diameter portion 72 of the plunger 71 in opposition to the loading of the biasing coil spring 94, the pressure in the rear brake operating sub-system at which the plunger 71 is moved away from the position in which the frusto-conical chamfered surface portion 76 is seated upon the co-operating frusto-conical shoulder 68 of the stepped bore within the valve body 64 is less than it is when there is no pressure in the front brake operating sub-system.

The relation between the diameters of the smallest diameter bore portion 65 and the intermediate diameter bore portion 66 of the stepped bore that is formed in the valve body 64, and the diameter of the bore of the bush 78 depends on the design characteristics of the valve device 58. The plunger 71 will be moved away from the position in which its frusto-conical chamfered surface portion 76 is seated upon the co-operating frusto-conical shoulder shoulder 68 when there is no liquid pressure in the front brake operating sub-system only if the cross-sectional area of the smallest diameter bore portion 65 is less than the cross-sectional area of the bore of the bush 78. The thrust that opposes the action of the biassing spring 94 when the ball 88 is unseated and the front brake operating sub-system fails will be equal to or less than the thrust that assists the action of the biassing spring 94 so that the ball 88 will remain unseated and the pressure that acts in the motor cylinders 53 to apply brakes to the rear wheels 51 of the vehicle will remain equal to that developed in the respective master cylinder chamber 56 if the cross-sectional area of the smallest diameter bore portion 65 of the stepped bore is equal to or is greater than the cross-sectional area of the bore of the bush 78.

FIG. 4 shows a valve device 58A which is a modified form of the valve device 58. The following description of the valve device 58A will be limited to those features of the valve device 58A that differ from the corresponding features of the valve device 58. Features of the valve device 58A that are similar to corresponding features of the valve device 58 and which are referred to in the following description of the valve device 58A will be identified by the reference by which the corresponding parts of the valve device 58 are identified above and to which the suffix "A" is added. The valve device 58A differs from the valve device 58 in that the coil spring 94 and the spring retainer can 95 are omitted, the reduced diameter outer stem portion 75A of the valve device 58A extending through the central aperture of an annular boot 96 of flexible material. The valve body 64A of the valve device 58A is mounted on the body 98 of the vehicle so that the reduced diameter outer stem portion 75A of the plunger 71A projects towards a lever 99 which is mounted pivotally upon the valve body 64A. A coil spring 101 has one end coupled with a component 102 of the vehicle suspension system which moves with up and down movement of the rear wheels 51 of the vehicle relative to the vehicle body 98 and the other end coupled to an end portion of the lever 99 which is spaced from the lever fulcrum.

The valve device 58A has inlets 59A and 61A and outlets 60A and 63A which are similar to those of the valve device 58 and by which it is connected in a similar manner into a liquid presure braking system which is similar to that which has been described above with reference to FIG. 3. The plunger assembly 71A of the valve device 58A is urged towards the lever 99 by the differential liquid pressure loading that acts upon it when the tandem master cylinder 54 is operated to apply the brakes, so that the reduced diameter outer stem portion 75A of the plunger 71 abuts a point on the lever 99 between the lever fulcrum and the end of the lever 99 to which the coil spring 101 is coupled. Hence the coil spring 101 acts through the lever 99 to exert a biasing load upon the plunger 71A which varies with the loading of the vehicle and which acts to oppose the differential liquid presure loading upon the plunger.

A valve device in which the present invention is embodied, in addition to having the advantage that the cavity can be formed totally upon a single forming machine without the position of the valve body upon the worktable of the machine being changed, has the advantage that the single pin 45 co-operates directly with a surface of the cavity in the housing to unseat the ball of the one-way valve member. Also the plunger of the valve device can be made in one piece.

I claim:
1. A valve device for use in a liquid pressure braking system of a vehicle to so control the pressure that is exerted to apply brakes on a group of wheels of the vehicle that that pressure, under a predetermined condition, is reduced in relation to the pressure at a source from which that pressure is derived, the predetermined condition being the pressure of the braking system at which the valve device becomes operative, including a valve body, a cavity which is formed in the valve body and which has a longitudinal axis, and first and second ports which are formed in the valve body, which communicate with the cavity and which are spaced apart in the direction of the longitudinal axis of the cavity, the first port being for connection to the source of liquid pressure and the second port being for connection to motor cylinders for operating brakes on said group of wheels; a plunger, a land which is formed by the plunger and which makes a fluid tight sliding joint with a wall portion of the cavity which extends between the first and second ports, the plunger being so arranged that the area thereof exposed to liquid pressure at the first port is less than that exposed to liquid pressure at the second port; stop means which limit movement of the plunger in a direction in which it is biased by biasing means at least during operation of the liquid pressure braking system and which is the direction in which it is urged by the action of liquid pressure at said first port; a passage through the land in the plunger, a one-way valve in the passage, the one-way valve comprising a valve seat, a valve member and resilient means which urge the valve member to seat upon the valve seat, the one-way valve being orientated so that flow through the plunger from the first port to the second port is prevented when the one-way valve member is seated, abutment means on the plunger and against which the resilient means that act to urge the one-way valve member to seat upon the valve seat react, a valve unseating pin within that part of the passage that extends from the one-way valve seat to the end of the passage that is nearer to the second port, and a stop surface in the cavity which co-operates with the valve unseating pin to unseat the one-way valve closure member when the plunger engages the stop means, wherein the improvement comprises said passage part being inclined to the axis of the plunger.

2. A valve device according to claim 1, wherein the improvement further comprises the remainder of the passage through the land in the plunger being co-axial with said passage part.

3. A valve device according to claim 2, wherein the improvement further comprises the abutment means comprising a ring which is carried by the plunger and which surrounds part of the plunger.

4. A valve device according to claim 3, wherein the improvement further comprises the ring being a resilient split ring which is engaged in a shoulder of the plunger.

5. A valve device according to claim 4, wherein the improvement further comprises a packing ring which engages both the wall of the cavity and the plunger and which is supported by structure which forms the end of the cavity at the side of the plunger land on which the first port is located, and a conical coil spring which acts between the packing ring and the resilient split ring, the conical coil spring holding the packing ring against said structure and acting on a surface of the split ring to exert a radially inwardly directed force on said split ring.

6. A valve device according to claim 1, wherein the improvement further comprises the stop surface being a surface of said stop means.

7. A valve device according to claim 6, wherein the improvement further comprises the stop means comprising a closed end of the cavity and the stop surface being part of the surface of a conical recess within the surface of that closed end of the cavity.

8. A valve device according to claim 6, wherein the improvement further comprises the stop surface being a shoulder in the surface of the cavity.

9. A valve device according to claim 1, for use in one sub-system of a liquid pressure braking system of a vehicle and which is so constructed and arranged that, in use, in the event of failure of another sub-system of the liquid pressure braking system which operates to apply brakes to another group of wheels of the vehicle, the degree of pressure reduction that takes place in said one sub-system is less than that which occurs when both sub-systems are working normally, wherein the improvement further comprises the cavity being a stepped cavity which has a central portion of uniform cross-section between two end portions, each end portion of the cavity having a uniform cross-section and being smaller in cross-sectional area than is the central portion of the cavity, said cavity wall portion being the wall of the central cavity portion; the plunger being a stepped plunger which comprises a plunger assembly which is located within makes a fluid tight sealing joint with the wall portion of the cavity that extends between the first and second fitted slidably within the central cavity portion and each of the other two lands being fitted slidably within a respective one of the two end cavity portions, and a third port which opens into the closed end portion of the cavity, the first and second ports opening into the central cavity portion one on each side of the central plunger land that fits in that central cavity portion, the arrangement being such that, when the valve device is mounted in a liquid pressure vehicle braking system, liquid pressure in said one sub-system exerts a force on the stepped plunger which is opposed by said biasing means and so that liquid pressure in the other sub-system also acts to oppose the biasing means with the result that the total force that opposes the action of the biasing means on said stepped plunger is less when the other sub-system is operative than it is when said other sub-system is operative.

10. A valve device according to claim 9, wherein the improvement further comprises the closed end portion and the central portion of the cavity being respective portions of a stepped bore which is formed within the valve body, the other end portion of the cavity being formed in another body which is supported by said valve body.

* * * * *

UNITED STATES PATENT OFFICE
CERTIFICATE OF CORRECTION

PATENT NO. : 4,008,925
DATED : February 22, 1977
INVENTOR(S) : Alastair John Young It is certified that error appears in the above—identified patent and that said Letters Patent are hereby corrected as shown below:

Page 1, Item (73), the word "Company" should be deleted so that the name of the Assignee reads:

Automotive Products Limited.

Signed and Sealed this

Sixth Day of December 1977

[SEAL]

Attest:

RUTH C. MASON
Attesting Officer

LUTRELLE F. PARKER
Acting Commissioner of Patents and Trademarks